US008522352B2

(12) United States Patent
Lu et al.

(10) Patent No.: US 8,522,352 B2
(45) Date of Patent: Aug. 27, 2013

(54) KEY DEVICE WITH EXTERNAL STORAGE AND THE USING METHOD THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 1420 days.

(21) Appl. No.: 11/876,195

(22) Filed: Oct. 22, 2007

(65) Prior Publication Data
US 2008/0098138 A1    Apr. 24, 2008

(30) Foreign Application Priority Data
Oct. 23, 2006   (CN) .......................... 2006 1 0113971

(51) Int. Cl.
*G06F 21/00*    (2013.01)
(52) U.S. Cl.
USPC ................................ 726/26; 711/164; 710/74
(58) Field of Classification Search
USPC .......................................... 726/26; 711/164
See application file for complete search history.

(56) References Cited

U.S. PATENT DOCUMENTS

| 6,919,892 | B1 * | 7/2005 | Cheiky et al. | 345/473 |
| 7,536,203 | B2 * | 5/2009 | Elwan et al. | 455/558 |
| 2007/0078768 | A1 * | 4/2007 | Dawson | 705/50 |
| 2007/0169200 | A1 * | 7/2007 | Wang et al. | 726/26 |
| 2007/0214369 | A1 * | 9/2007 | Roberts et al. | 713/192 |

* cited by examiner

Primary Examiner — Jeffrey Pwu
Assistant Examiner — Helai Salehi
(74) Attorney, Agent, or Firm — Hammer & Associates, P.C.

(57) ABSTRACT

A key device with external storage and its method of use, which relates to the computer security technology field, is disclosed herein. The key device with external storage consists of a micro-controller unit and an off-chip mass storage. The micro-controller unit comprises a host interface module, a CPU, a key data storage module, a firmware program storage module, and an off-chip mass storage interface module. The method of using the key device with external storage includes: the key device builds connection with the host and reports itself as a mass storage device; the host starts the application program; and the user uses and manages the information. The usability of the key device is improved by adding off-chip mass storage in the key device, which makes the user use and manage the files in the key device easily as well.

16 Claims, 2 Drawing Sheets

_(1)_
KEY DEVICE WITH EXTERNAL STORAGE AND THE USING METHOD THEREOF

FIELD OF THE INVENTION

The present invention relates to a key device with improved usability. More particularly, the present invention relates to a key device with improved usability via connecting an external storage and the using method thereof.

BACKGROUND OF THE INVENTION

With the rapid development of the information technology, key device is widely used in many industries and fields. As a small-scale hardware device with a processor and storage, the key device can be connected to the computer via the data communication interface of the computer. It has the function of key generation and can store the key safely, preset the encryption algorithm as well. The key-related calculation is performed inside the key device. And with the character of attack resistance, the key device has high security. USB Key is a key device with USB interface, and the built-in single chip or smart card chip can store the key or digital certificate of user.

An interface pops up automatically and prompts Auto-play or Auto-run when the external hardware device is connected to the computer. This program is called Auto-play or Auto-run program, which helps the external hardware user know the content of the external device. Meanwhile, it directs the user to install and use the software and data of the external hardware device. As we all know, a compact disc will be executed automatically when it is inserted into the CD-ROM drive, which is a built-in function of the operating system. And AutoRun.inf file is needed to be located under the root directory of the compact disc as required by the operating system in the process of making the compact disc. The operating system will detect whether a compact disc is inserted into the CD-ROM drive when it starts up. If the compact disc is found, the operating system will execute a preset program after finding the AutoRun.inf. The built-in encryption algorithm in the key device has the function of key generation and can safely store the sensitive information as digital certificate, key, etc. However, according to the prior art, the key device provides small storage and has independent software. The user must get the software of the key device or download the software from the internet after buying the key device. Only with the software, can the user effectively and completely use the key device, operate the inside related programs and manage the inside information. That brings some inconvenience to the common user of the key device.

At present, the key device, which is alleged USB Key, generally is connected to the desktop via USB interface. Another kind of widely used portable storage, which is usually called USB flash disk, is also connected to the USB interface. USB flash disk has large storage, while key device has a little bit small storage and could not store the supporting software.

The disadvantage of the prior art is: the key device is inconvenient to use due to the supporting software is independent. The user has to get software separately.

SUMMARY OF THE INVENTION

The present invention intends to solve the inconvenient use of the key device provided by the prior art. It provides a key device with external storage and the using method thereof, which can make the key device run automatically when it is connected to the host. In this invention, the software of the key device needs to be preset in the external storage.

The technical solution is as follows:

The present invention provides a key device with external storage. It consists of a micro-controller unit and an off-chip mass storage. The micro-controller unit comprises a host interface module, a CPU, a key data storage module, a firmware program storage module and an off-chip mass storage interface module; the host interface module is adapted to connect a host with the key device; the micro-controller unit and the off-chip mass storage are connected via the off-chip mass storage interface module.

The off-chip mass storage and the micro-controller unit are bound physically.

The key data storage module stores digital certificates, keys, and/or user's private data.

The firmware program storage module stores the firmware program of the key device. The firmware program is mainly adapted to realize communications between the key device and the host, analyze and process the information sent by the host, realize management of rights, perform input/output management for all memory sections, and encrypt and/or decrypt data.

The off-chip mass storage stores the software of key device; user uses and manages the information in the key device via application program.

The software of the key device is Auto-run software specifically.

The host interface module realizes serial or parallel communication between the key device and the host.

The host interface module is a USB interface module.

The CPU in the micro-controller unit is coupled to the host interface module, and the key data storage module, the firmware program storage module and the off-chip mass storage interface module in the micro-controller unit respectively.

Each of the key data storage module and the firmware program storage module in the micro-controller unit, and the off-chip mass storage comprises one or more of ROM, EPROM, EEPROM or Flash memory.

The off-chip mass storage interface module is adapted to perform serial or parallel communication between the off-chip mass storage and the micro-controller unit after their physical connection.

The off-chip mass storage interface module is a SPI (Serial Peripheral Interface) module.

The key device also includes a biometrics processing unit for acquiring the fingerprint, iris or voice information and processing the extracted information by analog/digital converting, character extraction, eigenvector transform and comparison.

The present invention provides a using method of the key device with external storage; the following steps are:
  A: the key device is connected to the host via host interface module;
  B: the key device reports itself as a mass storage device to the host when it is connected the host;
  C: the host starts the application program directly via the software in the key device;
  D: the user uses and manages the information in the key device via the application program.

The software in the step C is Auto-run software written by software developer/user according to functions provided by the key device.

The application program in step C is the preset program of AutoRun.inf, which is a program provided by operating system or written by a software developer/user; the preset program is started via AutoRun.inf.

The application program in the step D is stored in the host or in the key device, and executed in the host at runtime, and used to use and manage the firmware program of the key device. The benefits of the technical solution provided by the present invention are:

The usability of the key device is improved by adding the off-chip mass storage that stores the software of the key device. User can use and manage the files in the key device conveniently as well.

DETAILED DESCRIPTION OF THE PREFERRED EMBODIMENTS

The present invention is further described with the embodiments and the drawings below, but not limited the present invention. The present invention combines two kinds of technology: USB flash disk and USB Key. Common user can use the key device conveniently by storing the necessary software in the key device.

Embodiment 1

Figure 1:
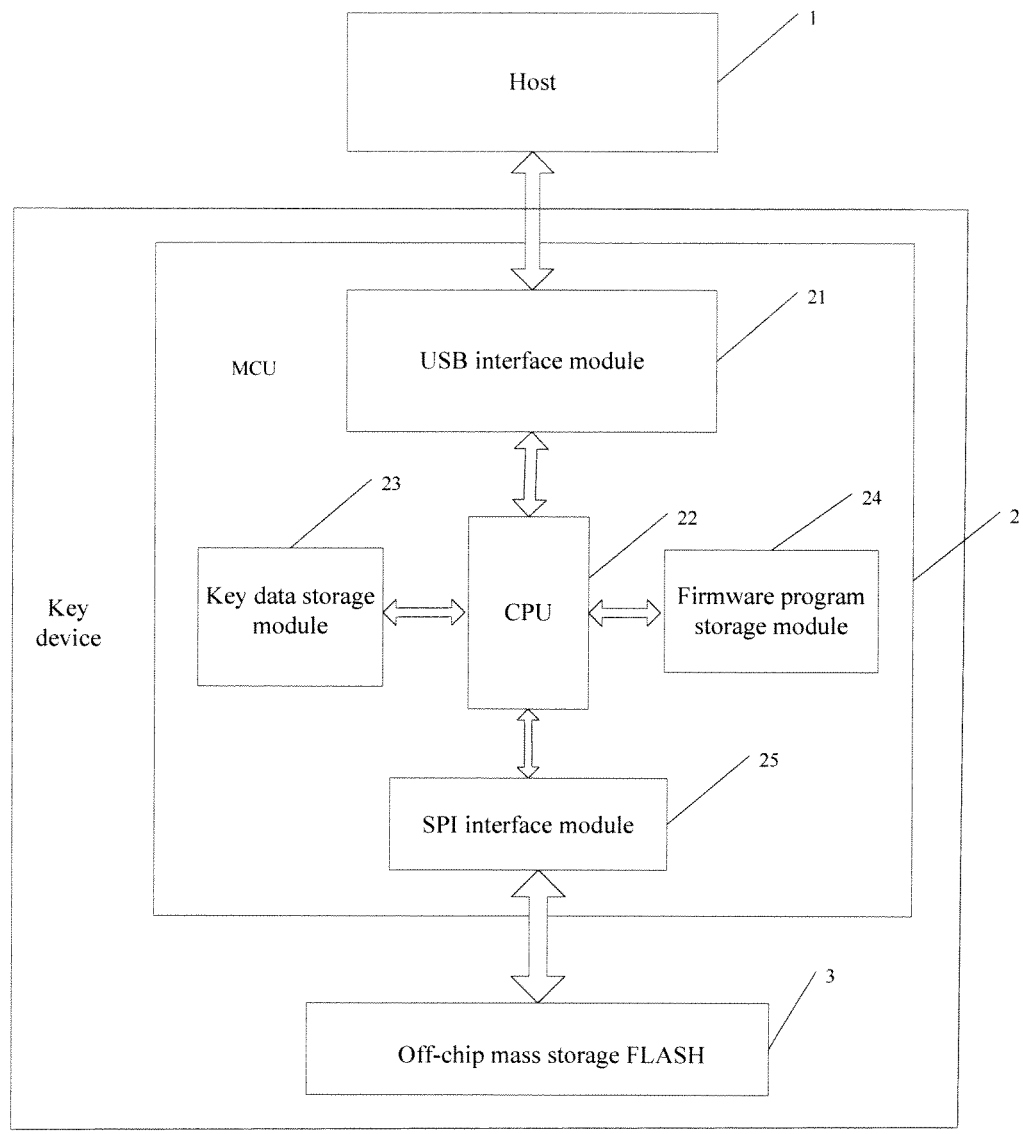
FIG. 1 is the diagram of the key device with external storage provided in embodiment 1 of the present invention.

Referring to FIG. 1, the present invention provides a key device with external storage device. The key device consists of a micro-controller unit 2 and an off-chip mass storage. The micro-controller unit 2 consists of a host interface module, a CPU 22, a key data storage module 23, a firmware program storage module 24, an off-chip mass storage FLASH 3, and an off-chip mass storage interface module. The host interface module is adapted to connect key device and host 1. The host interface module in the embodiment is a USB interface module 21. The off-chip mass storage interface module is adapted to connect the micro-controller unit 2 and the off-chip mass storage FLASH 3. The off-chip mass storage interface module of the embodiment is a SPI (Serial Peripheral Interface) interface module 25.

MCU: with the appearance and development of the large-scale IC (Integrated Circuit), CPU, RAM, ROM and many I/O interfaces are integrated into one chip, which forms chip-level computer. USB interface module 21, CPU 22, key data storage module 23, firmware program storage module 24 and SPI (Serial Peripheral Interface) interface module 25 are integrated into the micro-controller unit 2. The off-chip mass storage FLASH 3 and the micro-controller unit 2 are bound physically.

The micro-controller unit 2 is the chip designed for the information security. The micro-controller unit 2 and the smart card chip can be realized by the FLASH chip ST22 with the capacity of 1M which is produced by STMicroelectronics company. The key data storage module 23 stores the sensitive information as digital certificates, keys, and/or user's private data etc. It has enough space to store the preset data and is controlled by CPU 22.

The firmware program storage module 24 stores the firmware program of the key device. The firmware program is mainly adapted to realize the communication between the key device and the host 1, analyze and process the information sent by the host 1, perform input/output management for all memory sections, and encrypt/decrypt the data and is controlled by CPU 22.

The off-chip mass storage FLASH 3 stores the software of the key device and is adapted to control the performance of the firmware program in the micro-controller unit 2.

In the embodiment, the software of the key device can be Auto-run software.

The USB interface module 21 is Universal Serial Bus which is coupled to the micro-controller unit 2 and the host 1. It realizes the serial communication between the key device and the host 1.

The CPU 22 of micro-controller unit 2 in the key device is coupled to the USB interface module 21, key data storage module 23, firmware program storage module 24, SPI (Serial Peripheral Interface) interface module 25 respectively.

In the micro-controller unit 2, the key dada storage module 23 is an EEPROM, the firmware program storage module 24 is also an EEPROM, and the off-chip mass storage 3 is a Flash memory. In the present invention, the key data storage module of micro-controller unit 2, firmware program storage module and off-chip mass storage module can be made up of combination of EEPROM, EEPROM or Flash memory.

The SPI (Serial Peripheral Interface) interface module 25, which is coupled to the micro-controller unit 2 and off-chip mass storage FLASH 3, is responsible for performing the serial communication after building the physical connection between off-chip mass storage FLASH 3 and micro-controller unit 2. The key device in the present invention includes other processing units. For example, a biometrics processing unit for acquiring the fingerprint, iris or voice information and processing the extracted information by analog/digital converting, character extraction, eigenvector transform and comparison. That enhances the usability and security of the key device.

Embodiment 2

Figure 2:
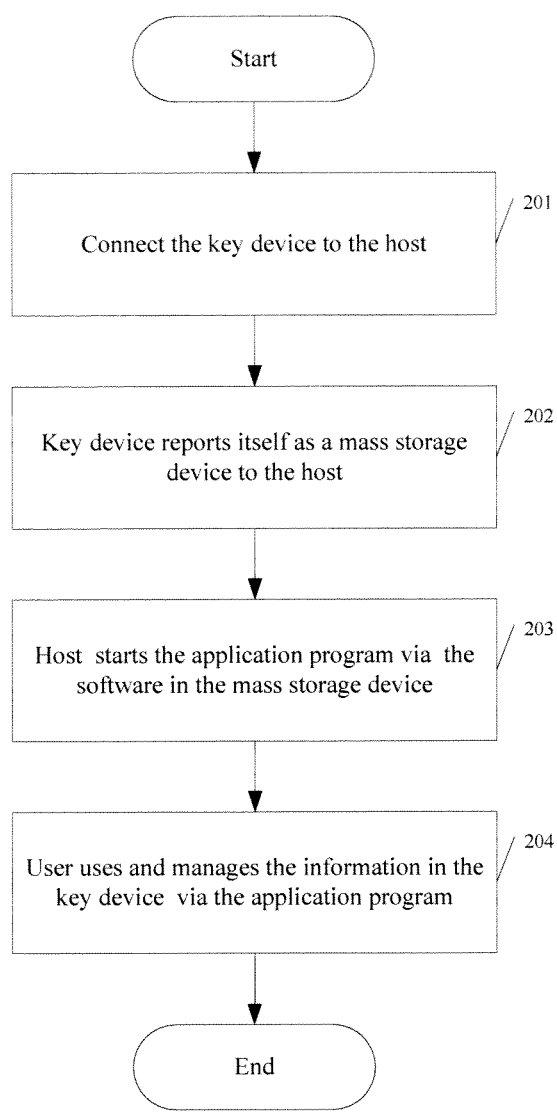
FIG. 2 is the flow diagram of embodiment 2, which shows the use of key device of embodiment 1.

FIG. 2 is the using method flow diagram of the key device provided by embodiment 1. The following are the steps:

step 201: the key device is connected to the host 1 via USB interface module 21;

step 202: the key device reports itself as a mass storage device to the host 1;

step 203: the host 1 starts the application program directly via the software of the key device in the mass storage device;

step 204: the user uses and manages the information in the key device via the application program.

In this embodiment, the software in the step 203 is Auto-run software written by developer/user according to functions provided by the key device.

In this embodiment, the application program in step 203 is the preset program of AutoRun.inf, which is a program provided by operating system or written by software developer/user. The preset program is started via AutoRun.inf. The application program is set in the host or the key device and runs in the host. The firmware program in the key device is used and managed via this application program. Details are as follows:

[AutoRun]//means AutoRun started and entry needed.

Icon=F.ico//A personalized icon of F.ico is given to the mass storage device.

Open=setup.exe//Specify the path and name of the program to be run, hereof a setup.exe file in mass storage device.

In the program above, the format of the [AutoRun] line is fixed; the corresponding file of "Icon" line is icon file; "F.ico" is the path and name of icon file; ".ico" is the extended name of icon file.

The details above introduce an invention of a key device with external storage with a high usability. It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A key device with external storage comprising a micro-controller unit and an off-chip mass storage that stores a software which is used to manage information in the key device by controlling operation of a firmware program when the software is executed in a host at runtime, wherein the micro-controller unit comprises a host interface module, a CPU, a key data storage module, a firmware program storage module which stores the firmware program and an off-chip mass storage interface module; the host interface module is adapted to connect the host with the key device; the micro-controller unit and the off-chip mass storage are connected via the off-chip mass storage interface module, wherein the firmware program storage module is adapted to store the firmware program of the key device; the firmware program is mainly adapted to realize communications between the key device and the host, analyze and process the information sent by the host, realize management of rights, perform input/output management for all memory sections, and encrypt and/or decrypt data, wherein controlling operation of the firmware program by the software is completed by the software specifying a path and a name of a preset program that is stored in the off-chip mass storage module, and the software executing the preset program in the host.

2. The key device with external storage of claim 1, wherein the off-chip mass storage and the micro-controller unit are bound physically.

3. The key device with external storage of claim 1, wherein the key data storage module is adapted to store digital certificates, keys and/or user's private data.

4. The key device with external storage of claim 1, wherein the software is a setup.exe file.

5. The key device with external storage of claim 1, wherein the host interface module is adapted to realize serial or parallel communication between the key device and the host.

6. The key device with external storage of claim 1, wherein the host interface module is a USB interface module.

7. The key device with external storage of claim 1, wherein the CPU in the micro-controller unit is coupled to the host interface module, and the key data storage module, the firmware program storage module and the off-chip mass storage interface module in the micro-controller unit respectively.

8. The key device with external storage of claim 1, wherein each of the key data storage module and the firmware program storage module in the micro-controller unit, and the off-chip mass storage comprises one or more of ROM, EPROM, EEPROM or Flash memory.

9. The key device with external storage of claim 1, wherein the off-chip mass storage interface module is adapted to perform serial or parallel communication between the off-chip mass storage and the micro-controller unit after their physical connection.

10. The key device with external storage of claim 1, wherein the off-chip mass storage interface module is a SPI (Serial Peripheral Interface) module.

11. The key device with external storage of claim 1, wherein the key device also comprises a biometrics processing unit for acquiring a fingerprint, iris or voice information and processing the extracted information by analog/digital converting, character extraction, eigenvector transform and comparison.

12. A using method of the key device with external storage according to claim 1, wherein the method comprises the following steps:
A: the key device comprising a key data storage module, an off-chip mass storage and a firmware program storage module is connected to the host via host interface module;
B: the key device reports itself as a mass storage device to the host when it is connected the host;
C: the host starts the preset program which is stored in the off-chip mass storage of the key device and is executed in the host at runtime directly via a software in the key device;
D: the user uses and manages the information in the key device via the preset program by controlling operation of a firmware program,
wherein the firmware program storage module is adapted to store the firmware program of the key device; the firmware program is mainly adapted to realize communications between the key device and the host, analyze and process the information sent by the host, realize management of rights, perform input/output management for all memory sections, and encrypt and/or decrypt data;
wherein controlling operation of the firmware program by the software is completed by the software specifying a path and a name of a preset program that is stored in the off-chip mass storage module, and the software executing the preset program in the host.

13. The key device with external storage of claim 5, wherein the software of the key device is Auto-run software specifically.

14. The using method of the key device with external storage of claim 12, wherein the software in the step C is Auto-run software written by developer/user according to functions provided by the key device.

15. The using method of the key device with external storage of claim 12, wherein the preset program is AutoRun.inf preset program, which is a program provided by operating system or written by a software developer/user; the preset program is started via AutoRun.inf.

16. The using method of the key device with external storage of claim 12, wherein the preset program in the step D is stored in the key device, executed in the host at runtime, and used to use and manage the firmware program of the key device.

* * * * *